United States Patent
Peterson et al.

[11] 3,854,604
[45] Dec. 17, 1974

[54] ARTICLE STORAGE AND RETRIEVAL

[75] Inventors: Charles E. Peterson, Boulder; Donald W. Schaefer, Lakewood, both of Colo.

[73] Assignee: International Business Machines Corporation, Armonk, N.Y.

[22] Filed: Nov. 8, 1972

[21] Appl. No.: 304,698

[52] U.S. Cl......... 214/16.4 A, 214/730, 214/16.1 A, 340/174.1 C
[51] Int. Cl............................................. B65g 1/06
[58] Field of Search.......... 214/16.4 A, 730, 16.1 A, 214/16.4 R, 95; 340/172.5, 174.1 C

[56] References Cited
UNITED STATES PATENTS

| | | | |
|---|---|---|---|
| 2,785,809 | 3/1957 | Riblet | 104/44 R |
| 2,918,656 | 12/1959 | Nolde et al. | 214/16.4 A |
| 3,297,379 | 1/1967 | Artaud et al. | 214/16.4 A X |
| 3,504,808 | 4/1970 | Corabateas | 214/16.4 A |

Primary Examiner—Robert J. Spar
Assistant Examiner—R. B. Johnson
Attorney, Agent, or Firm—Herbert F. Somermeyer

[57] ABSTRACT

A dual storage wall automatic storage and retrieval apparatus preferably for article storage includes a novel, pivotable, article storage and retrieving device for enabling the orientation of the articles in the storage compartments to remain the same. The article handling mechanism can exchange articles at the ends of the storage arrays. A plurality of stable positions is provided in the handling mechanism for facilitating article transfer between storage compartments and article storage and retrieval apparatus.

10 Claims, 6 Drawing Figures

POSITION M

POSITION M

POSITION 1

POSITION M

POSITION 1

ARTICLE STORAGE AND RETRIEVAL

DOCUMENTS INCORPORATED BY REFERENCE

Burke et al. U.S. Pat. Nos. 2,941,738 and 2,941,739.

Beach et al. U.S. Pat. No. 3,584,284.
Rinkleib U.S. Pat. No. 3,631,971.
Badum et al. U.S. Pat. No. 3,627,225.

BACKGROUND OF THE INVENTION

The invention relates to article handling and storing apparatus and more particularly to such apparatus useful for handling document-containing articles.

The general arrangement of the Burke et al patents, supra, describes storage apparatus requiring that the document-containing article (a two-spool magnetic tape cartridge) be maintained the same with respect to the carriage. However, it has been found that transferring document-containing articles by electromagnetic means increases the tolerances for successful rapid storage and retrieval of the articles to and from storage compartments. The Rinkleib patent, supra, describes such a document-containing article. To use the Rinkleib articles in a storage apparatus such as in Badum et al. and Burke et al., it is desired to have the magnetic disk always facing the travel path when stored in a storage wall. When the article is processed through the wall to an article receiving station for document processing, this orientation must always be the same with respect to such a processor. Therefore, in order to be able to have a facing dual-wall storage apparatus as shown in Burke et al., either two article storage and fetching devices are employed on a single carriage or elevator or the mechanism must be pivotable. Pivoting the mechanism in close tolerance areas creates several severe problems, but may be the least expensive solution.

SUMMARY OF THE INVENTION

It is an object of the invention to provide a low-cost, facile, fast-operating, pivotable article fetching and storing apparatus for use in a dual-wall storage apparatus.

In a preferred form of the invention, the information document storage apparatus has two spaced-apart parallel-extending storage walls, each wall having a plurality of open and facing storage compartments. A main carriage carrying an elevator system is movably disposed between the facing storage compartment walls for selectively accessing any of the storage compartments. Additionally, document processing means are preferably provided for selectively receiving document-containing articles in the same manner as the storage compartment receives same. The elevator system has two-dimensional movements along a given defined plane between said walls. A frame on the elevator has a horizontal platform. A bed is pivotably disposed on the platform for selective pivoting motions transverse to the defined plane. The elevator further has suitable control means connected to said pivoting bed for establishing plural stable pivoted positions. The first of the stable positions includes a front end portion of the pivoting bed being adjacent a first of said storage walls for facilitating exchange of document-containing articles with a selected storage compartment. A second of said stable positions includes such first end portion being adjacent the second one of said storage walls for enabling exchanges of document-containing articles with storage compartments in such wall. A reciprocating article carriage is disposed in the pivoting bed and includes document or article retaining means. The article carriage is reciprocable between a traveling position which is central of the pivoting bed and a load/unload position wherein the carriage is disposed over the front end portion of the pivoting bed. Additionally, a third or intermediate stable position can be provided wherein the document-containing article is disposed substantially parallel to the defined plane.

The foregoing and other objects, features, and advantages of the invention will become apparent from the following more particular description of the preferred embodiment as illustrated in the accompanying drawing.

THE DRAWING

DETAILED DESCRIPTION

Figure 1:
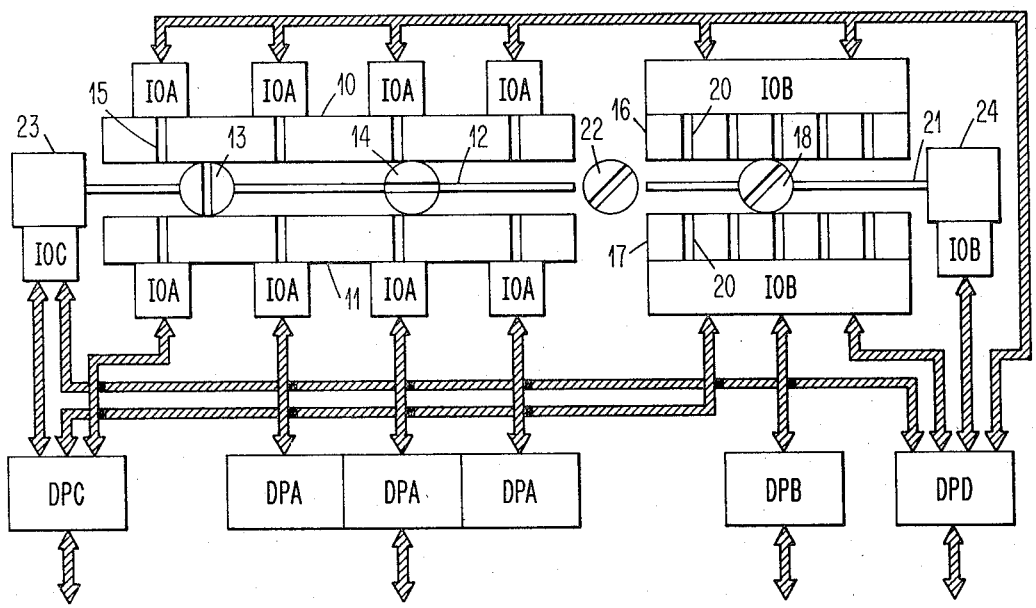
FIG. 1 is a simplified diagrammatic showing of a data processing system in which the present invention can be advantageously practiced.

Referring now more particularly to the drawings, like numerals indicate like parts and structural features in the various diagrams and views. An application of the present invention is shown in FIG. 1 which includes a pair of multicompartment and facing storage walls 10 and 11 having a travel path therebetween along a rail 12. A plurality of main carriages with elevator systems 13 and 14 travel along rail 12 with the elevator being pivotable between a plurality of positions, as will be described. Each storage wall 10 and 11 has a plurality of document-containing article transfer ports 15 extending between the travelway and the plurality of input/output stations labeled IOA. Each IOA is a document processing station such as a magnetic tape reader (Badum et al., supra) and has the capability of reading signals recorded on magnetic tape, recording signals on the tape, and handling all the data therefrom at a first given rate. It should be noted that the length of the travel path between walls 10 and 11 is longer than any other travel path shown in FIG. 1.

The documents contained in compartment walls 10 and 11 constitute a main data storage base for a data processing facility. The various IOA's are connected to a plurality of data processors DPA having a first computing capability. Connections of such data processors to magnetic tape units are well known and not further described.

Additionally, a pair of shorter storage walls 16 and 17 is disposed at one end of walls 10 and 11. A single carriage 18 travels between walls 16 and 17 and operates in an identical manner as carriages 13 and 14. A larger plurality of article transfer ports 20 extends between the second-mentioned travel path for carriage 18. Adjacent the storage walls 16 and 17 are two sets of input-/output stations IOB which have a higher data rate capacity than stations IOA. These stations are connected to a higher capability data processing system DPB and to a yet higher capability data processing system DPC and DPD. The stations IOA and IOB, respectively adjacent walls 10 and 16, are all connected in parallel to DPD for facilitating data exchanges therebetween. Additionally, transfer station 22 is disposed between the ends of rails 12 and 21 for facilitating exchange of articles between carriages 14 and 18. A pair of article storage systems 23 and 24 is respectively disposed on opposite ends of the travel paths 12 and 21. Each of these article storage systems has at least one input/output station IOB and IOC, respectively. These magnetic tape units, or input/output stations, are in turn connected to data processing systems.

From the above description, it is seen that the present invention is designed to work in a very complicated information storage and retrieval system employing article transfer operations of document-containing articles.

Figure 2:
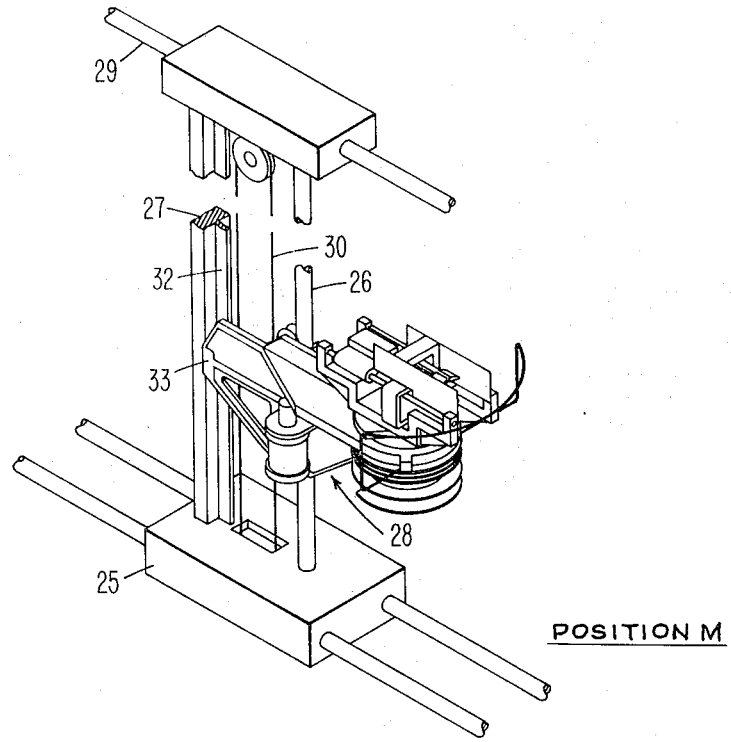
FIG. 2 is a simplified diagrammatic perspective view of article storage and retrieval apparatus incorporating the present invention and shown in the mid-position M.

Each carriage 13, 14 and 18 includes main carriage 25 disposed on one or two rails as best seen in FIG. 2. Each main carriage has an upstanding elevator post 26 spaced from upstanding guide post 27. The two posts are spaced apart for precisely guiding elevator 28 along a vertical path. Upper rail 29 is engaged by the upper end portion of posts 26 and 27 for ensuring precise vertical alignment. Elevator 28 is powered vertically by a motor within main carriage 25 through a cable system including cable 30. Precise location of elevator 28 is indicated by the positioning system described in Beach et al., supra. Upstanding elevator post 26 is preferably circular for maintaining the precise alignment of elevator 28 between the facing walls as the post wears from extended usage.

Guide post 27 has a forwardly extending tooth 32 which rides in a mating groove at the rearward end portion 33 of elevator 28. The elevators in carriages 13 and 14 are preferably arranged with the respective elevator post 26 facing each other with guide posts 27 closer to the respective ends of storage walls 10 and 11.

Each elevator 28 includes cast frame 35 rotatably supporting four spaced-apart circumferentially grooved rollers 36. The adjustment of these rollers provides precise horizontal alignment of platform 37 integrally formed on frame 35. Rotation of elevator 28 about post 26 is prevented by the above-described guide post engagement with rear portion 33. In addition to drive cable 30 moving elevator 28 along a vertical travel path, a flexible signal and power cable extends from main carriage 25 to elevator 28. This flexible cable is connected to junction board 38 which in turn supplies power through flexible cable 39 to one of the circuit boards 40A as will be later more fully appreciated.

An annular ball bearing (not shown) assembly precisely supports bed 40 on horizontal platform 37 for pivoting about a vertical axis. Reciprocating or article carriage 41 is movably disposed on bed 40 for reciprocating motion between a travel position central of the pivoting bed and load/unload position wherein the carriage is disposed over the front end portion of pivoting bed 40 such as at 42.

Figure 3:
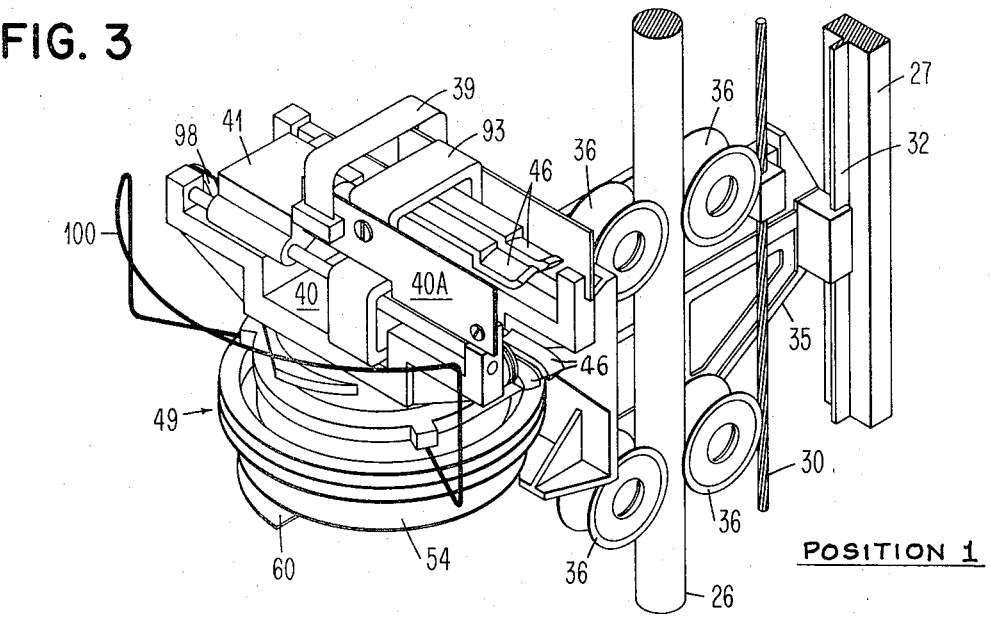
FIG. 3 is a simplified diagrammatic perspective view of pivoting article handler usable with the FIG. 2 illustrated apparatus and shown in stable position 1.
Figure 6:
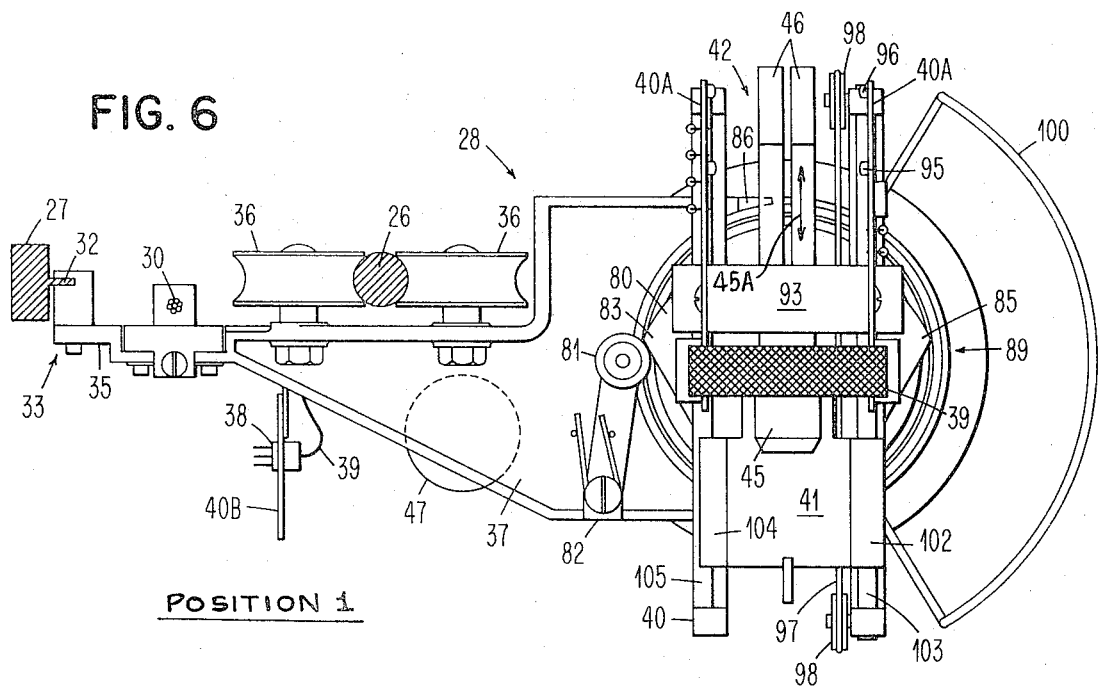
FIG. 6 is a simplified diagrammatic plan view of the FIG. 3 illustrated apparatus and shown in stable position 1.

The operation of the device is as follows. Elevator 28 is appropriately vertically positioned, while the main carriage assumes its selected horizontal position. To fetch a document-containing article, pivotable bed 40 is pivoted to stable position 1. As shown in FIG. 3, upon reaching stable position 1 as indicated by sensors later described, carriage motor 43 via carriage driving capstan 44 moves carriage 41 forwardly. Electromagnet pole pieces (not shown) face toward the opening between article retaining fingers 46. The fingers 46 are fixedly secured to inverted yoke 93 of rotary bed 40. Electromagnet 45 reciprocates between the upper and lower pairs of fingers 46 as indicated by arrow 45A of FIG. 6. At the end of the forward stroke (toward the end of fingers 46), electromagnet 45 is energized attaching the article (Rinklieb, supra) to be loaded to the electromagnet. Reciprocating carriage 41 then returns to the travel position with the article being carried by electromagnet 45 between upper and lower pairs of flexible and resilient article retaining fingers 46. Fingers 46 constitute article nesting means. Electromagnet 45 may remain energized during main carriage travel.

The main carriage and elevator are then moved to the storage compartment or transfer port to which the article is to be lodged. Assume that it is on the opposite wall. The pivoting bed is then rotated 180° to stable position 2 (not shown in the drawing, but is 180° from stable position 1). When the main carriage 25 and elevator 28 are at the appropriate storage location and pivotable bed 40 is in stable position 2, reciprocating carriage 41 is again moved forwardly to a load/unload position. At the end of the forward stroke of reciprocating carriage 41, electromagnet 45 is de-energized. Upon reaching the unload position, the article is in the storage compartment or transfer port. Reciprocating carriage 41 is then returned to the travel position as shown in FIG. 3, and subsequent operations are performed.

To accommodate pivotable bed 40 being driven by pivotable-bed drive motor 47 mounted on the lower side of frame 35, platform 37 has a central opening through which depending shaft 48 of bed 40 extends. Driven cable drum 49 is securely fastened to depending shaft 48. Driving cable 50 extends about cable drum 49 and is fixedly secured to pivotable-bed driving capstan 51 at the upper end of drive motor 47. Control circuits 52, actuated as later described, control motor 47 to selectively move between stable positions 1 and 2 and, in certain embodiments, to intermediate stable position M. Drive motor 47 is preferably of the low-voltage DC type.

The power and signal cable extending between junction board 38 and circuit boards 40A on pivotable bed 40 include a multiturn wrap about electrical cable drum 53. On an inner radius of cable drum 53, cable 39 is folded at 90° and extends upwardly for electrical connections to circuit boards 40A. Cable drum 53 includes lower radially outwardly extending flange 54 for retaining cable 39 in the illustrated position. In stable position 1, cable 39 is relatively snuggly wrapped about drum 53. As pivotable bed 40 pivots to stable position 2, cable 39 tends to unwrap. To facilitate equal unwrap in all turns of cable 39, a mildly resilient spring 55 is secured to the inner turn of cable 39. This spring, preferably of molded plastic, urges the inner turn of cable 39 to expand radially outwardly. As tension is relieved on cable 39 as pivotable bed 40 pivots toward stable position 2, spring 55 urges the inner turns outwardly, taking up the slack that would normally occur in the outermost turn thereby keeping the outermost turn of cable 39 within the confines of radially outwardly extending flange 54.

Figure 4:
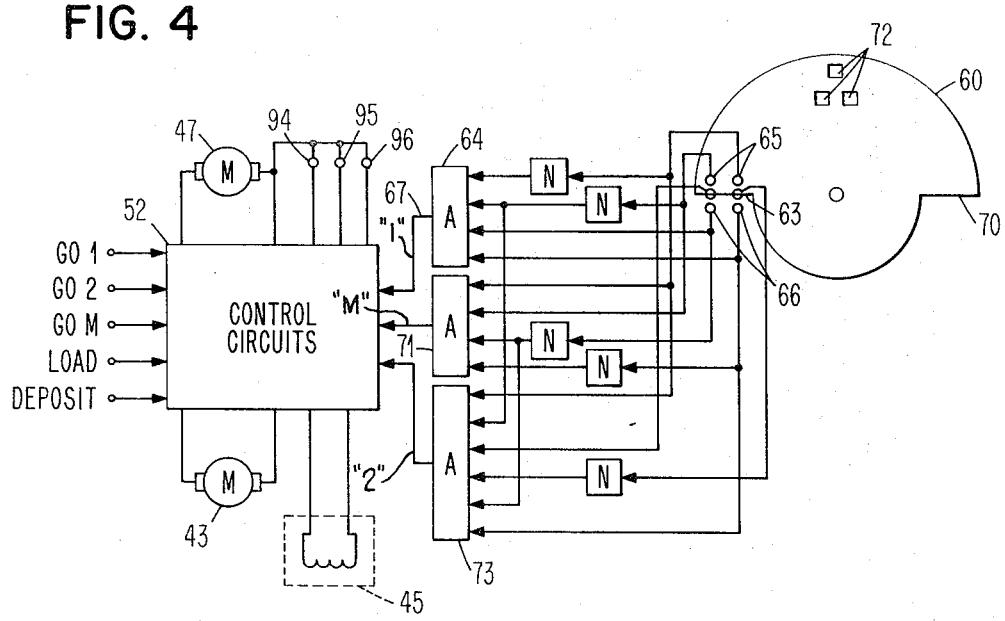
FIG. 4 is a simplified combined diagram of electrical and mechanical apparatus usable as control means for the FIG. 3 illustrated apparatus.
Figure 5:
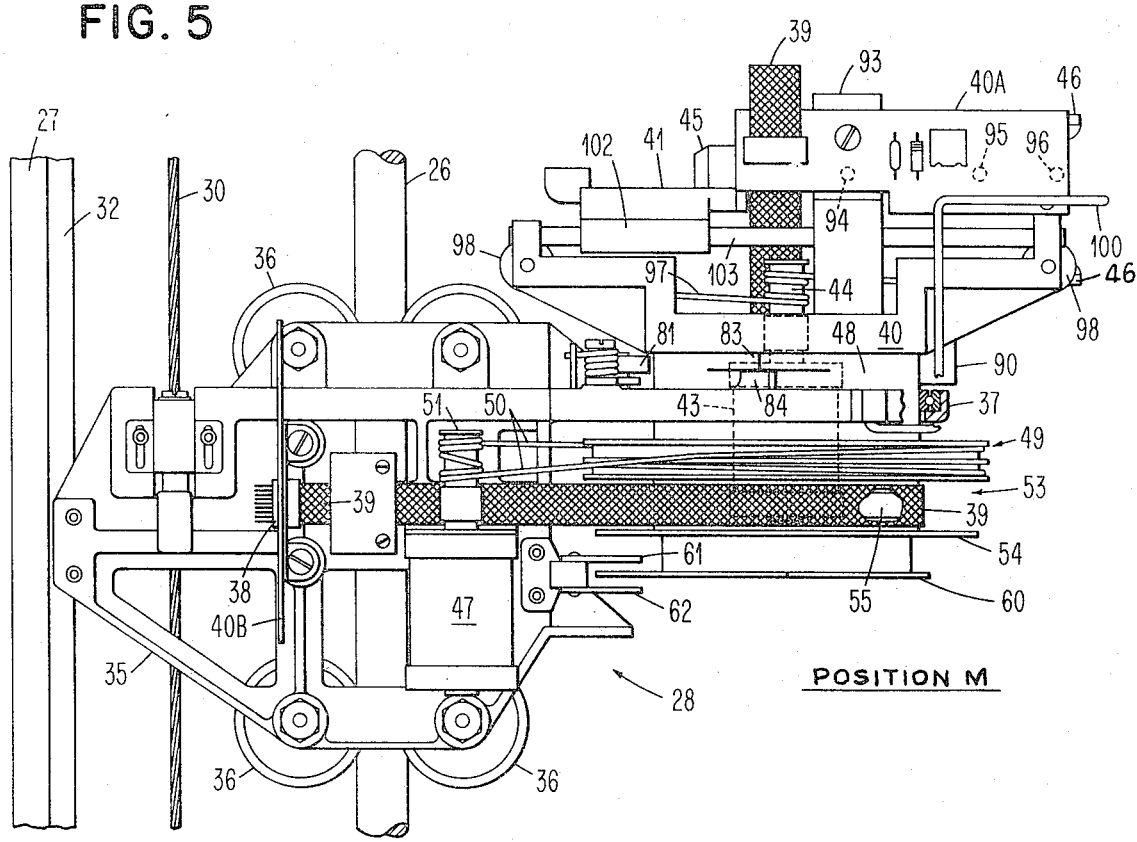
FIG. 5 is a simplified diagrammatic side elevational view of the FIG. 3 illustrated apparatus with selected cutaways to show internal constructional features and shown in mid-position 1.

Disposed coaxially below cable drum 53 is position indicating disk 60. Disk 60, formed as best seen in FIG. 4, moves between plates 61 and 62 on frame 35. These plates respectively contain light-emitting diodes (LED) and photosensitive transistors. The LED's are preferably focused such that their light will impinge on a single phototransistor to constitute an LED-transistor (LEDT) sensing pair. As shown in FIG. 4, six LEDT sensing pairs are employed. Stable position 1 is indicated when radial edge 63 of disk 60 is disposed intermediate the set of six LEDT sensing pairs. Logic AND circuit 64 is responsive to the LEDT pairs 65 indicating a broken light path and LEDT pairs 66 indicating a complete light path to supply a stable position 1 indicating signal over line 67 to control circuits 52. This informs control circuits 52 that pivotable bed 40 is in stable position 1. Note that the amplifiers and squaring circuits for converting LED-transistor generated currents are omitted for simplicity.

When radial edge 70 of disk 60 is disposed over the six pairs, then pairs 65 indicate a complete light path; while pairs 66 incicate a broken light path to actuate AND circuit 71. AND circuit 71 indicates stable position 2 to control circuits 52.

The intermediate position M is indicated by the three apertures 72 in disk 60 being disposed intermediate 3 of the 6 LEDT sensing pairs. AND circuit 73 responds to three of the pairs aligned with apertures 72 indicating a complete light path, with the other three pairs indicating a broken light path to indicate the intermediate position M to control circuits 52. In this regard, when intermediate position M is employed, control circuits 52 may include a servomechanism control circuit (not shown nor described) for accurately positioning pivotable bed 40 in the intermediate position. Such positioning controls are well known and are not further described for that reason. In the event a particular embodiment employs only stable positions 1 and 2, a mechanical detent or stop system (as will be described) can be employed for ensuring that pivotable bed 40 stays in the stable position until motor 47 is actuated to drive the bed to the other stable position.

Pivotable bed 40 includes detenting plate 80 which bears against spring-loaded detent follower roller 81 pivotably secured to frame 35 at 82. When detent plate outward end portion 83 is engaging detent follower roller 81, bed 40 is in stable position 1. If bed 40 tends to pivot past roller 81, the spring urging on detent follower 81 moves the pivotable bed against stop 84 thereby ensuring that bed 40 remains in stable position 1 until motor 47 is actuated to pivot bed 40 to the second stable position. The outward end portion 85 coacts with detent follower 81 in stable position 2 in the same manner as above described bearing the pivotable bed against stop 86 on platform 37. If it is desired, an axially movable stop (not shown) can be employed for intermediate position M. In this instance, whenever intermediate position M is desired, a stop on platform 37 would be raised at 89 to engage stop arm 90 on pivotable bed 40.

Circuit board 40A on pivotable bed 40 have three pairs of LEDT's for sensing the position of reciprocating carriage 41 and sensing the fact of an article being retained on carriage 41 by electromagnet 45 and article retaining fingers 46. Boards 40A are secured to inverted yoke 93 on bed 40. Sensors 94, 95, and 96 sense the article handling status in accordance with the table below.

| Status | Exemplary Article Handling Status | | |
| --- | --- | --- | --- |
| | Gap No. 96 | Forward No. 95 | Back No. 94 |
| Storage Compartment is Empty | Block | Open | Open |
| Article in Carriage | Open | Block | Block |
| Carriage is Empty | Open | (1) | (1) |
| Article Carriage is in Forward Position | Block | Open | Block |

Block means light path is broken; open means light path is completed. Note (1) indicates either or both light paths are open.

Carriage 41 has apertured boss 102 slidably secured on cylindrical rail 103 of bed 40. This arrangement accurately positions carriage 41. Additionally, carriage 41 has an outwardly opening guide groove portion 104 extending over rectangular rail 105 to complete the guiding arrangement. Electromagnet 45 is secured to the body portion of reciprocating carriage 41 in a ball-and-socket arrangement for permitting degrees of free motion for facilitating increasing tolerances in attaching to an article to be conveyed. The carriage driving cable is fixedly secured to boss 102 on the underside thereof and to driving capstan 44.

The control circuits and logic circuits shown in FIG. 4 may be suitably mounted on circuit boards 40A and 40B or may be installed in main carriage 25. Bail 100 may be installed on bed 40 to prevent an article being conveyed from dropping out of the article carriage during transit. For operating in position M, bail 100 is pivotally secured to bed 40 and electromagnetically moved to a noninterfering position.

While the invention has been particularly shown and described with reference to a preferred embodiment thereof, it will be understood by those skilled in the art that various changes in form and detail may be made therein without departing from the spirit and scope of the invention.

What is claimed is:

1. An information document storage apparatus having two spaced-apart parallel-extending facing storage walls each having a multiplicity of open storage compartments, plane travel means extending parallel to and disposed between said storage walls including improved movable means for selectively accessing any of said storage compartments, exchange means accessible by said movable means for exchanging documents with a document handler, the improved movable means including in combination:

main carriage means including elevator means for two-dimensional movements along a given defined plane in said plane travel means between said walls an elevator support pole on said carriage means;

a frame in said elevator movable along one of said two-dimensional movements along said defined plane and having a portion extending in cantilevered relationship from said elevator support pole;

a platform on said frame;

a pivoting bed having a front end portion on said platform and disposed for pivoting motions transverse to said defined plane;

reciprocating carriage means on said pivoting bed and including article retaining means and reciprocal between a traveling position central of said pivoting bed and a load/unload position at said front end portion; and control means on said frame connected to said pivoting bed for establishing plural stable pivoted positions for said pivoting bed, a first one of said stable positions including said front end portion being adjacent a first one of said storage walls for enabling exchange of an article between said article retaining means and a selected storage compartment in said first storage wall, a second one of said stable positions including said first end portion being adjacent a second one of said storage walls for enabling exchange of an article between said article retaining means and a selected storage compartment in said second storage wall.

2. Apparatus set forth in claim 1 further including in combination:

means in said control means limiting pivoting of said pivoting bed to about 180° between said first and second stable positions;

means on said platform sensing said bed when in said stable positions and supplying an indication of said stable positions; and means coupling said indication to said reciprocating carriage means to enable movement of same only when said bed is in a stable position.

3. Apparatus set forth in claim 2 further including a bail on said platform extending in spaced relation to said reciprocating carriage opposite said elevator support pole and between said stable positions.

4. Apparatus set forth in claim 2 further including a guide post extending in parallel spaced-apart relation to said elevation support post;

a guide portion on said frame extending between said support post to movable engagement with said guide post; and two pairs of facing circumferentially grooved rollers on said frame spaced apart along and rollingly engaging said elevator support post.

5. Apparatus set forth in claim 4 wherein said frame has a central circular aperture, said pivoting bed being pivotably secured to said frame coaxial of said aperture and having a depending portion extending through said aperture;

a hollow cylindrical cable drum coaxially mounted on said depending portion for rotation with said pivoting bed;

first electrical cable junction means on said frame adjacent said cable drum;

second electrical cable junction means on said pivoting bed adjacent said reciprocating carriage; and a flexible multiconductor cable extending between said junction means via said cable drum, thence centrally and inside said drum through said aperture to said second junction means, said cable having a portion on said cable drum with a length greater than the circumference thereof equal to the circumferential motion of said drum during maximum pivoting motion of said pivoting bed in said about 180° pivoting.

6. Apparatus set forth in claim 5 further including an electric motor disposed on said depending portion inside said hollow cylindrical cable drum and having a capstan extending through said platform to juxtaposition to said reciprocating carriage, and drive cable means interconnecting said capstan and said reciprocating carriage for effecting reciprocating motions.

7. Apparatus set forth in claim 6 wherein said article retaining means includes an electromagnet, and article nesting means on said pivotable bed front end portion disposed for receiving said electromagnet as said reciprocating carriage moves forwardly.

8. Apparatus set forth in claim 1 further including article exchanging means in said defined plane, the improved apparatus further including in combination:

additional means in said control means selectively establishing a third stable position with said reciprocating carriage movable parallel to said defined plane for exchanging articles with said article exchanging means.

9. Apparatus set forth in claim 8 further including in combination:

said control means including detent follower means on said platform and detent means on said pivotable bed engaging said detent follower means to establish said first and second stable positions;

pivot position indicating means on said cable drum; and position sensing and indicating means on said frame adjacent to and operatively associated with said indicating means for detecting and indicating when said pivoting bed is in a stable position.

10. An article storage and retrieval apparatus adapted to store and retrieve articles, two spaced-apart parallel-extending facing storage walls each having a multiplicity of open storage compartments, plane travel means extending parallel to and disposed between said storage walls including improved movable means for selectively accessing any of said storage compartments, exchange means accessible by said movable means for exchanging documents with a document handler, main carriage means including elevator means for two-dimensional movements along a given defined plane in said plane travel means between said walls, and elevator support pole on said carriage means;

the improvement including in combination:

a frame on said elevator means having a first elongated portion extending along a first axis;

two spaced-apart pairs of spaced-apart rollers on said first portion, said pairs being spaced along said first axis;

guide means on said frame extending transverse to said first axis;

a platform on said frame having a support plane transverse to said first axis and extending therefrom in a direction opposite to said guide means;

a pivoting bed on said platform with a pivot axis substantially parallel to said first axis;

means on said frame and operatively asociated with said pivoting bed to selectively pivot said pivoting bed about said pivot axis between plural stable positions;

reciprocating carriage means on said pivoting bed movable along a travel path transverse to said pivot axis between a travel position central of said bed and a store-retrieve position peripheral of said bed;

article nesting means on said bed in coaxial relation to said travel path; and article holding means movable with said reciprocating carriage with respect to said nesting means for putting an article to be transported into said nesting means.

* * * * *